United States Patent
Klausner

(10) Patent No.: US 11,567,984 B2
(45) Date of Patent: *Jan. 31, 2023

(54) SYSTEM AND METHOD FOR DETERMINING SIMILAR DIGITAL CONTENT ITEMS

(71) Applicant: THE KLAUSNER-BLOOM FAMILY TRUST, Redwood City, CA (US)

(72) Inventor: David Klausner, Redwood City, CA (US)

(73) Assignee: THE KLAUSNER-BLOOM FAMILY TRUST, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,008

(22) Filed: Aug. 23, 2021

(65) Prior Publication Data

US 2022/0027127 A1 Jan. 27, 2022

Related U.S. Application Data

(63) Continuation of application No. 15/187,088, filed on Jun. 20, 2016, now Pat. No. 11,100,156.

(51) Int. Cl.
| | |
|---|---|
| *G06F 16/16* | (2019.01) |
| *G06F 16/906* | (2019.01) |
| *G06F 16/43* | (2019.01) |
| *G06F 16/174* | (2019.01) |
| *G06F 7/02* | (2006.01) |
| *G06F 7/24* | (2006.01) |

(52) U.S. Cl.
CPC ............... *G06F 16/43* (2019.01); *G06F 7/02* (2013.01); *G06F 7/24* (2013.01); *G06F 16/164* (2019.01); *G06F 16/1744* (2019.01); *G06F 16/906* (2019.01)

(58) Field of Classification Search
CPC ............................ G06F 16/164; G06F 16/906
USPC ........................................................ 707/737
See application file for complete search history.

(56) References Cited

U.S. PATENT DOCUMENTS

| 7,664,763 | B1 * | 2/2010 | Russell | ................. H03M 7/30 707/769 |
|---|---|---|---|---|
| 2006/0230014 | A1 * | 10/2006 | Kedem | ................. G06F 3/0643 |
| 2008/0256093 | A1 * | 10/2008 | Amitay | ................. G06F 16/35 |
| 2013/0006948 | A1 * | 1/2013 | Shmueli | ................. G06F 16/185 707/693 |
| 2014/0201175 | A1 * | 7/2014 | Ohno | ................. G06F 16/1744 707/693 |

(Continued)

*Primary Examiner* — Kimberly L Wilson
(74) *Attorney, Agent, or Firm* — Ziegler IP Law Group

(57) ABSTRACT

Disclosed is a method and apparatus for identifying a group for similar digital content items. The method includes retrieving one or more digital content items and determining at least one characteristic of each digital content item. The determined one or more digital content items are transformed to form one or more transformed digital content items. At least one characteristic of the one or more digital content items is determined. The determined at least one characteristic of the one or more digital content items is assessed with respect to at least one characteristic of the one or more transformed digital content items to form a first transformation assessment result. The first transformation assessment result is used to determine a group for the one or more digital content items. A view of the results is provided.

21 Claims, 19 Drawing Sheets

(56) References Cited

U.S. PATENT DOCUMENTS

| | | | |
|---|---|---|---|
| 2015/0169562 A1* | 6/2015 | Connor | G06F 16/93 707/723 |
| 2016/0127746 A1* | 5/2016 | Maurer | H04N 19/146 382/246 |
| 2016/0216900 A1* | 7/2016 | Satou | G06F 3/0608 |

* cited by examiner

| Name of play / compression level | 1 | 2 | 3 | 4 | 5 |
|---|---|---|---|---|---|
| Comedy of Errors | 40.68% | 35.22% | 34.65% | 26.15% | 26.21% |
| Merry Wives of Windsor | 40.97% | 34.99% | 34.41% | 26.01% | 26.03% |
| Richard III | 41.39% | 34.64% | 34.06% | 25.52% | 25.58% |
| Two Gentlemen of Verona | 41.41% | 35.63% | 35.03% | 26.44% | 26.51% |
| Much Ado About Nothing | 41.63% | 35.63% | 35.05% | 26.31% | 26.37% |
| Julius Caeser | 41.97% | 35.86% | 35.26% | 26.47% | 26.53% |
| Love's Labour's Lost | 41.98% | 36.43% | 35.84% | 27.37% | 27.42% |
| As You Like It | 42.05% | 36.05% | 35.50% | 27.08% | 27.11% |
| Measure for Measure | 42.08% | 35.83% | 35.24% | 26.45% | 26.54% |
| Henry VI, part 3 | 42.11% | 35.33% | 34.72% | 25.99% | 26.03% |
| Taming of the Shrew | 42.16% | 36.01% | 35.42% | 26.77% | 26.83% |

(B)

| | | | | | |
|---|---|---|---|---|---|
| Troiles and Cressida | 42.94% | 36.65% | 36.02% | 27.21% | 27.27% |
| Henry IV, part 1 | 42.96% | 36.61% | 36.02% | 27.49% | 27.52% |
| Romeo and Juliet | 43.15% | 36.81% | 36.19% | 27.50% | 27.58% |
| Henry VI, part 2 | 43.22% | 36.61% | 35.96% | 27.26% | 27.34% |
| Timon of Athens | 43.25% | 37.42% | 36.77% | 27.75% | 27.82% |
| Henry VIII | 43.29% | 36.47% | 35.90% | 26.89% | 27.00% |
| Henry V | 43.33% | 37.19% | 36.56% | 28.18% | 28.23% |
| Pericles | 43.50% | 37.53% | 36.93% | 28.07% | 28.14% |
| King Lear | 43.62% | 37.01% | 36.35% | 27.28% | 27.36% |

| | | | | | |
|---|---|---|---|---|---|
| King John | 43.63% | 37.32% | 36.69% | 27.72% | 27.82% |
| Henry VI, part 1 | 43.68% | 36.96% | 36.31% | 27.40% | 27.49% |
| Midsummer Night's Dream | 43.70% | 38.08% | 37.49% | 28.81% | 28.87% |
| Macbeth | 43.86% | 37.83% | 37.25% | 28.21% | 28.29% |
| Winter's Tale | 44.10% | 37.49% | 36.82% | 27.82% | 27.94% |
| The Tempest | 44.13% | 38.37% | 37.75% | 28.80% | 28.88% |
| Cymbeline | 44.16% | 37.24% | 36.62% | 27.49% | 27.60% |
| | | | | | |
| Standard Deviation | 0.008674 | 0.008302 | 0.008202 | 0.007563 | 0.007598 |

| Name of play / compression level | 1 | 2 | 3 | 4 | 5 |
|---|---|---|---|---|---|
| Edward II | 41.11% | 38.45% | 37.93% | 30.94% | 30.96% |
| Tamburlaine, Part 1 | 42.02% | 39.20% | 38.70% | 31.52% | 31.54% |
| Tamburlaine, Part 2 | 42.05% | 39.53% | 39.09% | 32.34% | 32.34% |
| The Jew of Malta | 43.08% | 40.26% | 39.78% | 32.33% | 32.37% |

| AUTHORS/ALGORITHMS | Z1 | Z2 | Z3 |
|---|---|---|---|
| A1 | 0,23 | 0,12 | 0,1 |
| A2 | 0,24 | 0,12 | 0,11 |
| A3 | 0,22 | 0,13 | 0,09 |
| B1 | 0,43 | 0,33 | 0,23 |
| B2 | 0,44 | 0,34 | 0,22 |
| B3 | 0,42 | 0,32 | 0,23 |
| C1 | 0,12 | 0,08 | 0,05 |
| C2 | 0,13 | 0,07 | 0,05 |
| C3 | 0,12 | 0,08 | 0,06 |

| AUTHORS/ALGORITHMS | Z4 | Z5 | Z6 |
|---|---|---|---|
| A1 | 0,23 | 0,12 | 0,1 |
| A2 | 0,24 | 0,12 | 0,11 |
| A3 | 0,22 | 0,13 | 0,09 |
| B1 | 0,23 | 0,33 | 0,23 |
| B2 | 0,24 | 0,34 | 0,22 |
| B3 | 0,22 | 0,32 | 0,23 |
| C1 | 0,23 | 0,08 | 0,12 |
| C2 | 0,24 | 0,07 | 0,12 |
| C3 | 0,22 | 0,08 | 0,13 |

500B $$A = \begin{vmatrix} 0,23 & 0,12 & 0,1 & 0,23 & 0,12 & 0,1 \\ 0,24 & 0,12 & 0,11 & 0,24 & 0,12 & 0,11 \\ 0,22 & 0,13 & 0,09 & 0,22 & 0,13 & 0,09 \end{vmatrix}$$

$$B = \begin{vmatrix} 0,43 & 0,33 & 0,23 & 0,23 & 0,33 & 0,23 \\ 0,44 & 0,34 & 0,22 & 0,24 & 0,34 & 0,22 \\ 0,42 & 0,32 & 0,23 & 0,22 & 0,32 & 0,23 \end{vmatrix}$$

$$C = \begin{vmatrix} 0,12 & 0,08 & 0,05 & 0,23 & 0,08 & 0,12 \\ 0,13 & 0,07 & 0,05 & 0,24 & 0,07 & 0,12 \\ 0,12 & 0,08 & 0,06 & 0,22 & 0,08 & 0,13 \end{vmatrix}$$

500C

SYSTEM AND METHOD FOR DETERMINING SIMILAR DIGITAL CONTENT ITEMS

TECHNICAL FIELD

The present disclosure relates generally to pattern recognition and identification of digital content, and more specifically, to a system and method for determining an origin of digital content items and for determining a group for digital content items.

BACKGROUND

Digital content items include digital representations of content, such as, representations of images, music, video, documents, and the like in files and otherwise (e.g., streams). Such files can be stored in an electronic format, for example, Joint Photographic Expert Group (JPEG), Audio Video Interleave (AVI), Portable Document Format (PDF), Text File (TXT), Word Document (DOC), Moving Picture Expert Group (MPEG), Advance Audio Coding (AAC), Compressed File format such as ZIP, Hyper Text Markup Language (HTML), script, and the like, and transferred electronically, for example, from one data storage device to another, through electronic mail, file transfer, and the like. There are many existing methods available through which digital content items can be identified. One such method is for people/users to examine and analyze the digital content items by use of their senses. This ability of users to perform pattern recognition through their senses allows the users to determine, to a limited extent, when digital content items are forgeries, and when digital content items are subject to copyright and to trademark infringements, etc. However, the analysis of the digital content items by users is sometimes cumbersome and impractical when there are a large number of digital content items/electronic data. Further, users find it difficult to compare a large number of the digital content items to other digital content items to determine the probability and extent of the digital content items being similar or dissimilar when the digital content items are analyzed manually. Further, manual content identification methods are subjective, and may vary from person to person, and from expert to expert, thus reducing accuracy of identification.

Therefore, in light of the foregoing discussion, there exists a need to overcome the aforementioned drawbacks in existing approaches for identifying digital content items, including to determine the probabilities and extent of similarity, by using a more objective approach.

SUMMARY

The present disclosure seeks to provide a method for identifying a group for digital content items. The method comprises steps of: (a) retrieving one or more digital content item, (b) determining at least one characteristic of each digital content item, (c) transforming, with a first transformation method, said determined one or more digital content item to form one or more transformed digital content item, (d) determining at least one characteristic of said one or more transformed digital content item, (e) assessing said determined at least one characteristic of said one or more digital content item with respective at least one characteristic of said one or more transformed digital content item to form a first transformation assessment result, and (f) using said first transformation assessment result to determine a group for said one or more digital content item.

The present disclosure seeks to provide a method for determining an origin of a digital content item. The method comprises steps of: (a) retrieving a digital content item, (b) determining at least one characteristic of the digital content item, (c) transforming the digital content item to form a transformed digital content item using a first transformation method, (d) determining at least one characteristic of the transformed digital content item, (e) assessing said determined at least one characteristic of said one or more digital content item with respective at least one characteristic of said one or more transformed digital content item to form a first transformation assessment result, and (f) using said first transformation assessment result to determine an origin of the digital content item by comparing the transformation assessment result of the digital content item to a transformation assessment result of a digital content of known origin obtained using the first transformation method as explained below.

The present disclosure seeks to provide a system for determining an origin of a first digital content item. The system comprises a first storage for storing a transformation assessment result of said first digital content item and corresponding at least one identified origin of said digital content item, and a device for uploading a second digital content item to a service for determining a transformation assessment result of said second digital content item and determining a relationship between said transformation assessment result with the transformation assessment result of said first storage to determine an origin of said second digital content item.

Embodiments of the present disclosure substantially eliminate or at least partially address the aforementioned problems in the prior art, and enable transforming the digital content items using computerized methods and apparatuses to determine the probabilities of similarity.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure, and as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 3A-3D are tabular views that illustrate the transformation assessment storage of FIG. 1 that includes a plurality of digital content items and their corresponding transformation assessment results using a plurality of transformation methods for a first digital content item of known origin in accordance with an embodiment of the present disclosure;

FIG. 5A is a tabular view that illustrates a first plurality of transformation assessment results obtained using a first set of transformation methods for digital content items by a plurality of origins to identify and/or group the digital content items by origin, in accordance with an embodiment of the present disclosure;

Figure 1:
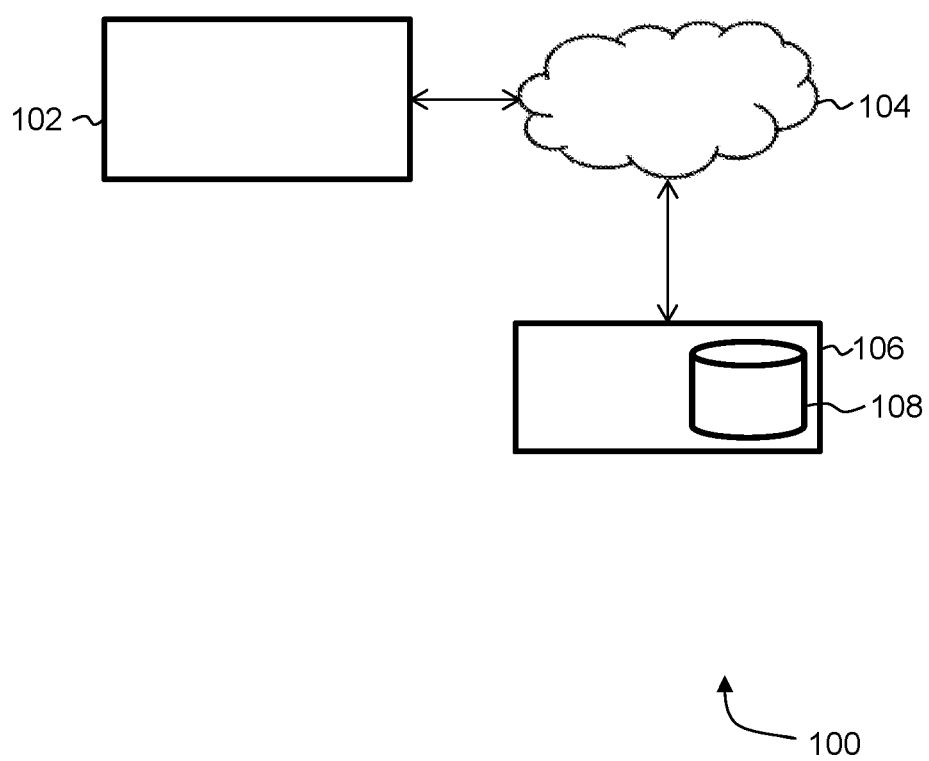
FIG. 1 is a schematic illustration of a user device communicating with a digital content transformation server through a network, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or for practicing the present disclosure are also possible. For examples, embodiments may be created using software, or using a Field Programmable Gate Arrays (FPGA(s)), or by using an Application Specific Integrated Circuits (ASIC(s)).

In one aspect, a method for identifying a group for digital content items is provided. The method comprises steps of: (a) retrieving one or more digital content item, (b) determining at least one characteristic of each digital content item, (c) transforming, with a first transformation method, said determined one or more digital content item to form one or more transformed digital content item, (d) determining at least one characteristic of said one or more digital content item, (e) assessing said determined at least one characteristic of said one or more digital content item with respective at least one characteristic of said one or more transformed digital content item to form a first transformation assessment result, and (f) using said first transformation assessment result to determine a group for said one or more digital content item.

In an embodiment, the method further comprises determining which of said one or more digital content items should be transformed.

According to one embodiment, the method is used for identifying a group for digital content items of a known origin and the transformation assessment result is related to said origin.

According to another embodiment, the transformation is done using a second transformation method different from the first transformation method for said one or more digital content item, to form a second transformation assessment result for said one or more digital content item.

According to another embodiment, the transformation is done using a third and optionally further transformation method different from the first and second transformation methods for said one or more digital content item, to form a third and optionally further transformation assessment result for said one or more digital content item.

According to another embodiment, the transformation method comprises compressing of said one or more digital content item with a compression algorithm.

According to another embodiment, the compression algorithm parameters vary between said first and optionally further transformation methods.

According to another embodiment, said one or more digital content item with transformation assessment results within a similar range belong to a similar group.

According to another embodiment, said transformation assessment result for said one or more digital content item are used in combination to determine a group for said one or more digital content item.

According to another embodiment, the at least one characteristic is a file size.

According to another embodiment, the assessing is calculating a ratio between a file size of the one or more transformed digital content item and a file size of the said one or more digital content item.

In another aspect, a method for determining an origin of a digital content item is provided. The method comprises steps of: (a) retrieving a digital content item, (b) determining at least one characteristic of the digital content item, (c) transforming the digital content item to form a transformed digital content item using a first transformation method, (d) determining at least one characteristic of the transformed digital content item, (e) assessing said determined at least one characteristic of said one or more digital content item with respective at least one characteristic of said one or more transformed digital content item to form a first transformation assessment result, and (f) using said first transformation assessment result to determine an origin of the digital content item by comparing the transformation assessment result of the digital content item to a transformation assessment result of a digital content item of known origin obtained using the first transformation method.

In an embodiment, the comparing said transformation assessment result of one or more digital content item to a transformation assessment result of the digital content item of known origin comprises comparing a second and optionally further transformation assessment result of the digital content item to a second and optionally further transformation assessment result of the digital content item of known origin obtained using the second and optionally further transformation method.

According to one embodiment, the digital content item is a form of text.

According to another embodiment, the digital content item is a form of software.

In another aspect, a system for determining an origin of a first digital content item is provided. The system comprises a first storage for storing a transformation assessment result of said first digital content item and corresponding at least one identified origin of said digital content item, and a device for uploading a second digital content item to a service for determining a transformation assessment result of said second digital content item and determining a relationship between said transformation assessment result with the transformation assessment result of said first storage to determine an origin of said second digital content item.

In an embodiment, the system and method determine a probability of two sets of digital content items being similar or dissimilar, or being copied from each other, or being created by a same author.

According to another embodiment, the system and method determine a probability of the identification of the digital content items.

According to another embodiment, the system and method receive queries and provide answers to the queries based on the determined probability of the identification of the digital content items.

According to another embodiment, the system includes the device (e.g., a user device), a network, a digital content transformation server, and transformation assessment storage (e.g., a file, or a database, etc.)

According to another embodiment, the user device may be a desktop, a mobile phone, a smart phone, a tablet, a personal computer, or an electronic notebook, etc. The user device is connected to the digital content transformation server through the network. The user device may upload one or more digital content items to analyze a degree of similarity of the one or more digital content items using the digital content transformation server. The user device may display the degree of the similarity of the one or more digital content items.

According to another embodiment, the storage or database (e.g., a file, or an internal or external database, etc.) stores the digital content items, and transformation assessment report for each of the digital content items, and an origin of one or more of the digital content items.

According to another embodiment, the digital content transformation server includes an internal file or database to store the one or more digital content items. The digital content transformation server performs a transformation on the one or more digital content items.

According to another embodiment, the digital content transformation server executes instructions to perform the transformation method on a first digital content item (e.g., an electronic copy of Shakespeare's "Romeo and Juliet",) to form a first transformed digital content item, and performs the same transformation method on a second digital content item (e.g., an electronic copy of Shakespeare's "Julius Caesar",) to form a second transformed digital content item. The transformation method may include, e.g., exporting, or converting (e.g., using Adobe Acrobat) the first digital content item or the second digital content item; or zipping the first digital content item, or the second digital content item by using a compaction (or compression) program such as Phil Katz ZIP compression program (PKZIP), Roshal Archive compression program (RAR), Windows (registered trademark) version of RAR (WinRAR), or Windows (registered trademark) version of ZIP compression technology (WinZip); or converting between data types or formats. The compaction program provides statistics on a degree of transformation/compaction of each digital content item, and may provide options for the degree of transformation/compaction to be performed. Transformation methods may also be used to form statistics.

According to an embodiment, the resulting statistics form a ratio between the first digital content item, and the second digital content item that are used to determine the degree of similarity. The resulting statistics may form a profile for each digital content item by varying the options of the transformation program.

According to another embodiment, the digital content transformation system comprises a digital content item origin determining module that determines an origin of the digital content item by comparing the transformation assessment result of the digital content item to a transformation assessment result of a digital content item of known origin obtained using the first transformation method.

According to another embodiment, the transformation includes compression, processing, and/or modifying of the digital content item. In addition to compression, other methods and tools for transformation and processing may be used as known to persons of ordinary skill in the art.

According to another embodiment, a compression ratio value (a ratio between a size of compressed file to a size of original file) is dependent on a selected compression algorithm.

According to another embodiment, the one or more digital content items are compressed based on encodings (e.g., Moving Pictures Expert Group, Advanced Audio Coding, Joint Photographic Experts group, or Portable Network Graphics, etc.)

According to another embodiment, the one or more digital content items are compressed based on algorithms (e.g., 7z, ZIP, and RAR). The user device executes the known algorithms to compress the one or more digital content items.

According to another embodiment, the compression algorithms may include options Z1 to Z6 that compress the one or more digital content items based on the RAR program. The compression algorithms represented by 0 (a fastest compression or a least compression) to 9 (a slowest compression or a maximum compression) may compress the digital content items by using the PKZIP program.

According to another embodiment, the system includes a software based system (that may include scripts), or a hardware based system, or a system that is a combination of software and hardware. The methods are performed using the system that are programmed, or by loading the software for execution on the system, such that the system executes the software to produce results.

The present disclosure can be applied to any electronic data. For example the embodiments can be used to analyze the origin of a software program or of executable code of the software program to determine a likely author or company. Embodiments can also be used to analyze HTML content of web sites to find likely correlations, detect copies, etc.

Embodiments of the present disclosure may be used to determine the probability of two sets of electronic data being similar or dissimilar, or having been copied from each other, or having been created by the same author. Embodiments may also be used to determine the probability that electronic data has been identified and attributed correctly. Embodiments may receive queries and provide answers to those queries based on the determined probability of the identification of electronic data.

DETAILED DESCRIPTION OF THE DRAWINGS

FIG. 1 is a schematic illustration 100 of a user device 102 communicating with a digital content transformation server 106 through a network 104, in accordance with an embodiment of the present disclosure. The schematic illustration 100 includes the user device 102, the network 104, and the digital content transformation server 106. The digital content transformation server 106 may include a transformation assessment storage 108 (e.g., a file, or a database, etc.) that stores a transformation assessment result of a digital content item and at least one identified origin of the digital content item. The user device 102 may be a desktop, a mobile phone, a smart phone, a tablet, a personal computer, electronic notebook, etc. The user device 102 communicates with the digital content transformation server 106 through the network 104.

The user device 102 may upload one or more digital content items to the digital content transformation server 106 to analyze a degree of similarity of the one or more digital content items. The user device 102 may display the degree of the similarity of the one or more digital content items based on characteristics of the digital content items, transformed characteristic of the digital content items, and transformation assessment results. The transformation assessment storage 108 stores the transformation assessment results of the digital content item and at least one identified origin of the digital content items. In an embodiment, the digital content transformation server 106 includes the transformation assessment storage 108 to store the one or more digital content items. In another embodiment, the transformation assessment storage 108 may be present in the user device 102 or in another device or server connected through the network 104. Item 108 may also be data stored in storage (temporary or persistent) in a way capable of being retrieved without that data being contained in a formal database.

The digital content transformation server 106 performs a transformation on a first digital content item to form a first transformed digital content item. The digital content transformation server 106 may perform the same transformation on a second digital content item to form a second transformed digital content item. The transformation may include a compaction or a compression (e.g., using PKZIP, RAR, WinRAR, or WinZip, etc.) that provides statistics on a degree of transformation/compaction of the each digital content item, and provides options for the degree of the transformation/compaction to be done. In an embodiment, the statistics form a ratio between the one or more digital content items that are used to determine the degree of similarity of the one or more digital content items.

Figure 2:
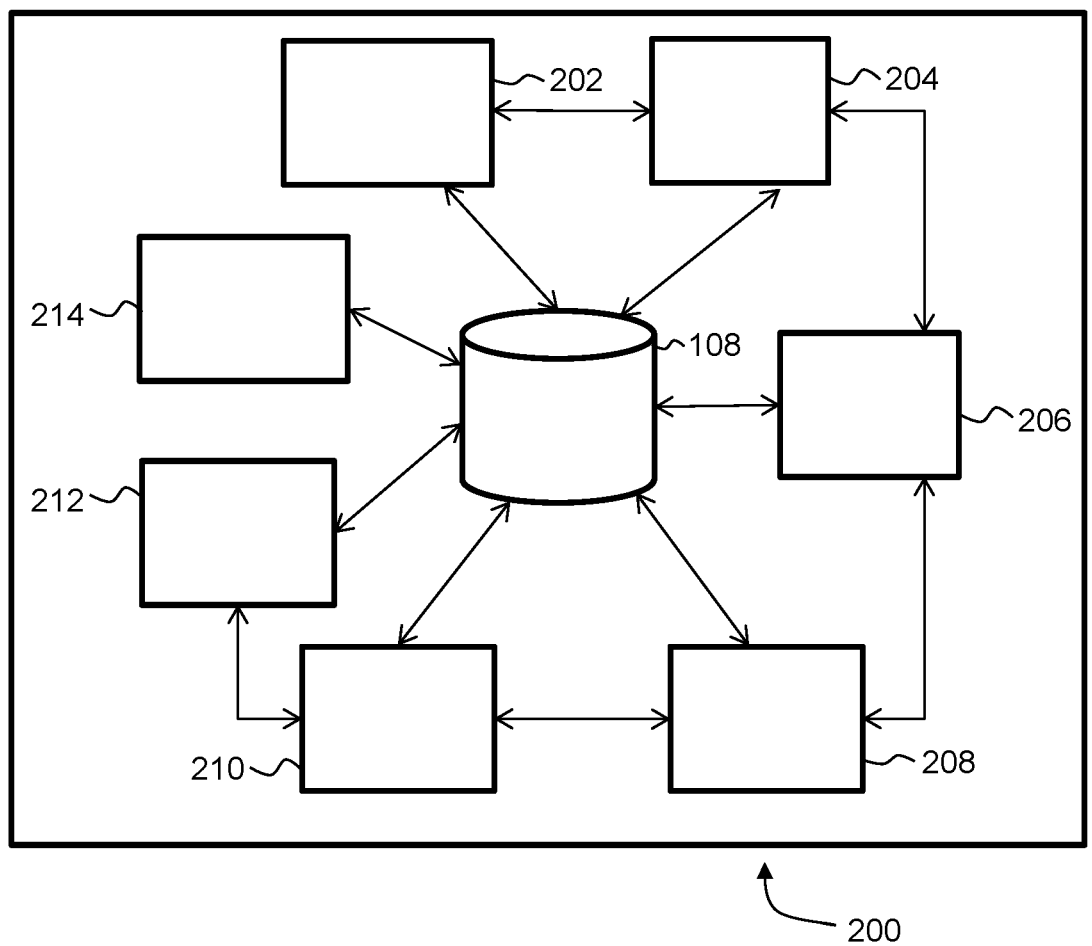
FIG. 2 is an exploded view of the digital content transformation server of FIG. 1, in accordance with an embodiment of the present disclosure.
Figure 3A:
Figure 3B:
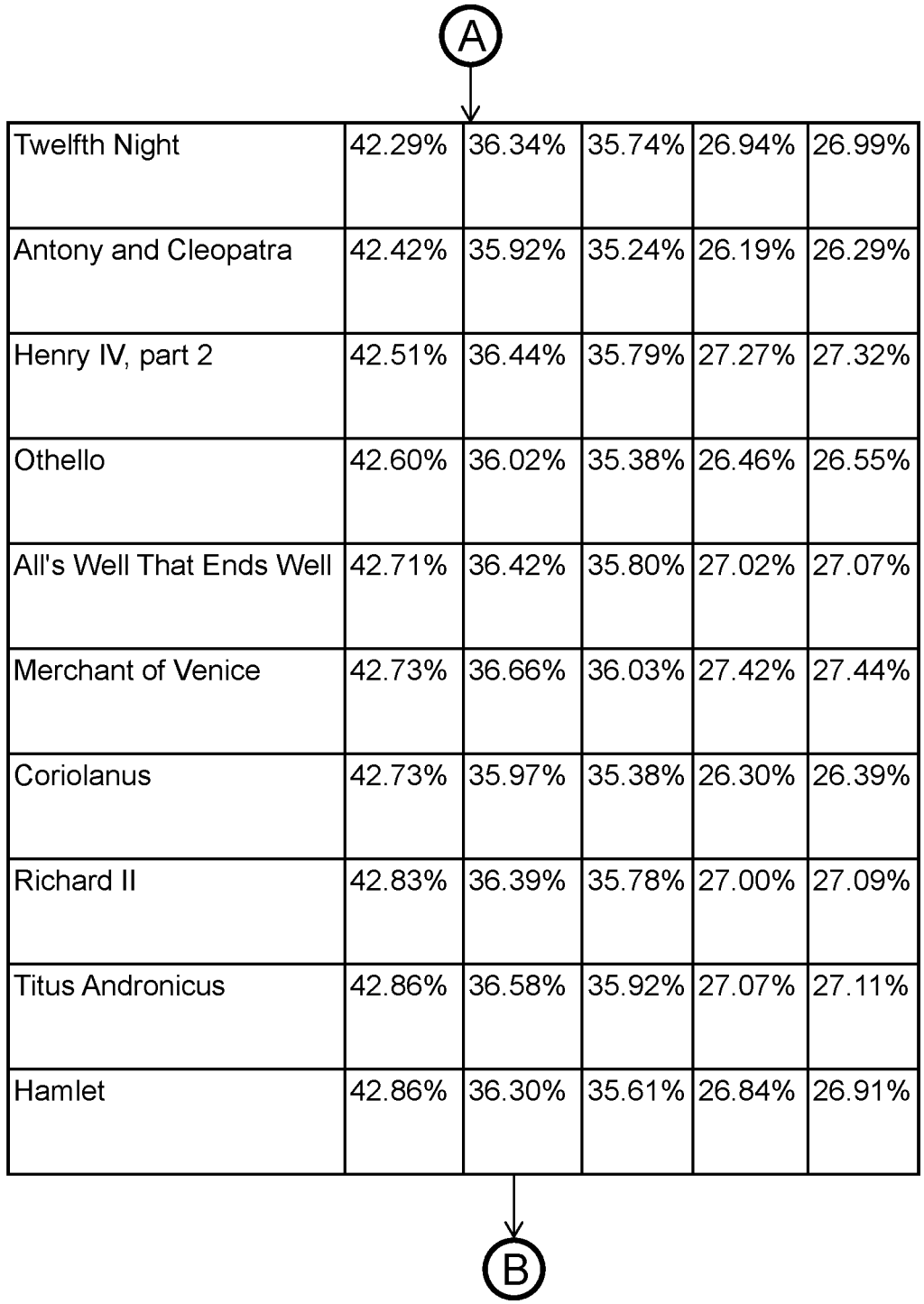
Figure 3D:

Referring to FIG. 2, illustrated is an exploded view 200 of the digital content transformation server 106 of FIG. 1, in accordance with an embodiment of the present disclosure. The exploded view 200 of the digital content transformation server 106 includes the transformation assessment storage 108, a characteristic determining module 202, a content transformation module 204, a transformation assessment result module 206, a group determining module 208, a content transformation identification module 210, an assessment range determining module 212, and a content origin determining module 214. The transformation assessment storage 108 stores a transformation assessment result of one or more digital content items, and a corresponding at least one identified origin of the one or more digital content items.

The characteristic determining module 202 determines at least one characteristic of the one or more digital content items (e.g., a file size of a digital content item). The content transformation module 204 performs a transformation on the one or more digital content items using one or more transformation methods to form one or more transformed digital content items. In an embodiment, the one or more transformation methods include at least one compression algorithm. For example, a first digital content item is transformed using a first compression algorithm. The characteristic determining module 202 further determines at least one characteristic of the one or more transformed digital content items. The transformation assessment result module 206 assesses the determined at least one characteristic of the one or more digital content items with respective at least one characteristic of the one or more transformed digital content items to form a transformation assessment result. In an embodiment, the assessment by transformation assessment result module 206 includes calculating a ratio between the file size of the one or more digital content items and the one or more transformed digital content items.

The group determining module 208 determines a group for the one or more digital content items using the transformation assessment result. The content transformation identification module 210 identifies which of the one or more digital content items should be transformed. The assessment range determining module 212 determines a range of values for the transformation assessment result. In an embodiment, the one or more digital content items with transformation assessment results within a similar range belong to a similar group. The content origin determining module 214 determines an origin of the one or more digital content items by comparing the transformed assessment result of the one or more digital content items to a transformed assessment result of a digital content item of known origin using a first transformation method. In an embodiment, the first transformation method includes the first compression algorithm. In another embodiment, an origin of one or more digital content items is determined based on one or more compression algorithms.

Referring to FIGS. 3A-3D, illustrated are tabular views that illustrate the transformation assessment storage 108 of FIG. 1 that includes a plurality of digital content items (e.g., plays) and their corresponding transformation assessment results using a plurality of transformation methods for a first play of known origin (e.g., authored by William Shakespeare), in accordance with an embodiment of the present disclosure. The tabular views 3A-3D include a list of plays of William Shakespeare (e.g., Comedy of Errors, Merry wives of Windsor, and Richard III, etc.) and a transformation assessment result (e.g., compression level of each of the plays of William Shakespeare.) At least one characteristic (e.g., a file size) of the plays is assessed with respect to the characteristic of the transformed (e.g., compressed) plays for a plurality of transformation methods (e.g., RAR compression algorithms z1 to z6 in increasing order of compression level). In an embodiment, a degree of compaction of William Shakespeare's plays varies from 40.68% to 44.16% with a standard deviation of less than 0.0087 for the lowest compression level (e.g., the compression level is 1).

William Shakespeare's words, sentences, and paragraphs are found to be different from each other to about eight and a half in 1000 across of all William Shakespeare's plays, and are identified as having an origin of William Shakespeare. This shows that his writing is consistent in plays that he is attributed to as author. Similarly, the result statistics suggest that when the plays of William Shakespeare that are identified to be at an extreme of the range of transformation and compaction (e.g. from a play "Comedy of errors" to a play "Cymbeline") are examined for different authorship, the result statistics indicate that all but one of William Shakespeare's comedies compacts less than that most of his tragedies, as shown in FIGS. 3A-3D. The degree of compaction of William Shakespeare's plays varies from 25.58% to 28.88% with the standard deviation of less than 0.0076 for the RAR compression level of 5. William Shakespeare's words, sentences, and paragraphs are different from each other to about seven and a half parts in 1000 across all of William Shakespeare's plays, and confirm that William Shakespeare is the author. The result statistics suggest the two more plays at an extreme of the range for further examination to evaluate the possibility of different authorship (e.g. from a play "Richard III" to a play "The Tempest").

Figure 4A:
FIGS. 4A-4B are tabular views that illustrate the transformation assessment storage of FIG. 1 that includes a plurality of digital content items and their corresponding transformation assessment results using a plurality of transformation methods for a second digital content item of known origin in accordance with an embodiment of the present disclosure.
Figure 4B:

Referring to FIGS. 4A-4B, illustrated are tabular views that show the transformation assessment storage 108 of FIG. 1 that includes a plurality of digital content items (e.g., plays) and their corresponding transformation assessment results using a plurality of transformation methods for a second play of known origin (e.g., authored by Christopher Marlowe), in accordance with an embodiment of the present disclosure. The tabular views include a list of names of plays of Christopher Marlowe (e.g., Edward II, Tamburlaine, Part 1, and Tamburlaine, Part 2, etc.) and a transformation assessment result (e.g., a RAR compression level) of each of the plays of Christopher Marlowe. The tabular views show that the degree of compaction of Christopher Marlowe's plays varies from 41.11% to 44.38% with the standard deviation of greater than 0.0115 when the RAR compression level is 1. Christopher Marlowe's words, sentences, and paragraphs are different from each other to about eleven and half parts in 1000 across all of his plays. The result statistics suggest that Christopher Marlowe is not the author of any of William Shakespeare's plays as shown in FIG. 4A. Although the play "As You Like It" transforms to the same 42.05% as a play of "Tamburlaine, Part 2" of Christopher Marlowe's at level 1, the result statistics are different at the level 5 (e.g. the play "As You Like It" includes the degree 27.11% and the play "Tamburlaine, Part 2" includes the degree 32.34%) that in turns indicates that the two plays include significant differences and originate from different authors.

Referring to FIG. 5A, illustrated is a tabular view 500A that illustrates a first plurality of transformation assessment results obtained using a first set of transformation methods for digital content items from a plurality of origins (e.g., authors) to identify and/or group the digital content items by origin, in accordance with an embodiment of the present disclosure. The tabular view 500A includes a list of authors and algorithms. For example, the tabular view 500A includes the list of authors A, B, and C and includes a plurality of digital content items A1, A2, A3 by author A; B1, B2, B3 by author B; and C1, C2, and C3 by author C. The texts are compressed with the first set of transformation methods, such as RAR compression algorithms Z1, Z2, and Z3, according to an embodiment. The resulting compression ratios (e.g. ratio of the size of the compressed file to the size of the original file) are collected in the table as shown in FIG. 5A. The values corresponding to each of the authors within a range can be attributed to the listed author. Further, the compression values vary depending on the used compression method and/or algorithm. The compression values tend to group together in a range that indicates the author.

Figure 5B:
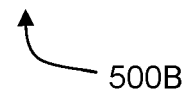
FIG. 5B is a tabular view that illustrates a second plurality of transformation assessment results obtained using a second set of transformation methods for digital content items by a plurality of origins to identify a group for the digital content items by origin, in accordance with an embodiment of the present disclosure

Referring to FIG. 5B, illustrated is a tabular view 500B that illustrates a second plurality of transformation assessment results obtained using a second set of transformation methods for digital content items from a plurality of origins (e.g., authors) to identify and/or group the digital content items by origin, in accordance with an embodiment of the present disclosure. The tabular view 500B includes the list of authors and the algorithms. For example, the tabular view 500B includes the list of authors A, B, and C, and includes texts of A1, A2, A3 by author A; B1, B2, B3 by author B; and C1, C2, and C3 by author C. The texts are compressed with the list of RAR algorithms Z4, Z5, and Z6. For example, the compression ratios with the RAR algorithm Z4 group to different authors who are relatively similar. The RAR algorithms Z5, and Z6 enable identifying a group for the authors since the transformation assessment results for different digital content items by the same author are within a similar range. The identification of a group of the authors may be accomplished by performing compression ratio comparisons with a plurality of compression algorithms.

Figure 5C:
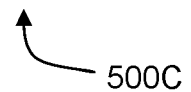
FIG. 5C is an exemplary view that illustrates a plurality of matrices of transformation assessment values for a plurality of transformation methods for a plurality of origins, in accordance with an embodiment of the present disclosure.

Referring to FIG. 5C, illustrated is an exemplary view 500C that illustrates a plurality of matrices of transformation assessment values for a plurality of transformation methods for a plurality of origins A, B, and C, in accordance with an embodiment of the present disclosure. The transformation methods may include a plurality of RAR compression algorithms z1 to z6, according to an embodiment. In an embodiment, one or more mathematical methods such as eigenvalue analysis may be used to differentiate the matrices from each other.

Figure 6A:
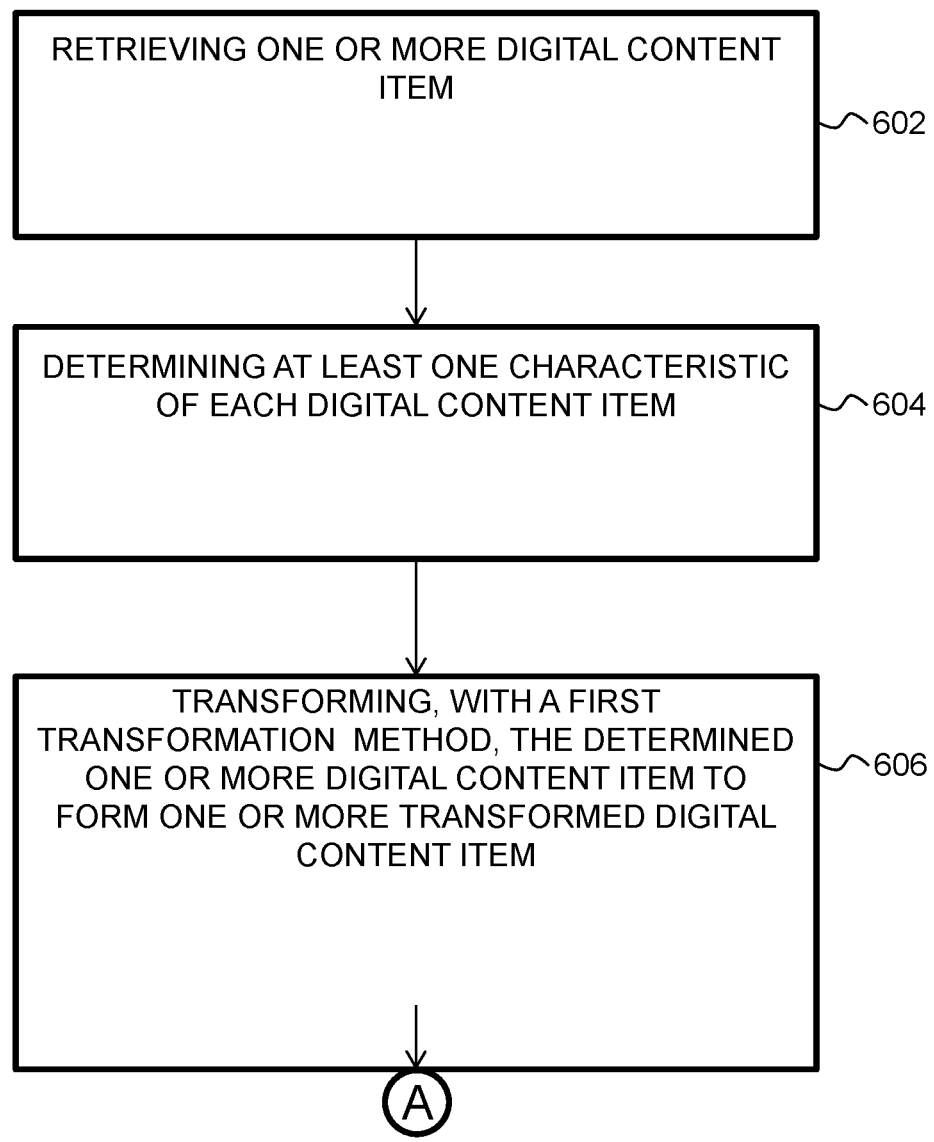
FIGS. 6A-6B are flow diagrams that illustrate a method for identifying a group for digital content items, in accordance with an embodiment of the present disclosure.
Figure 6B:
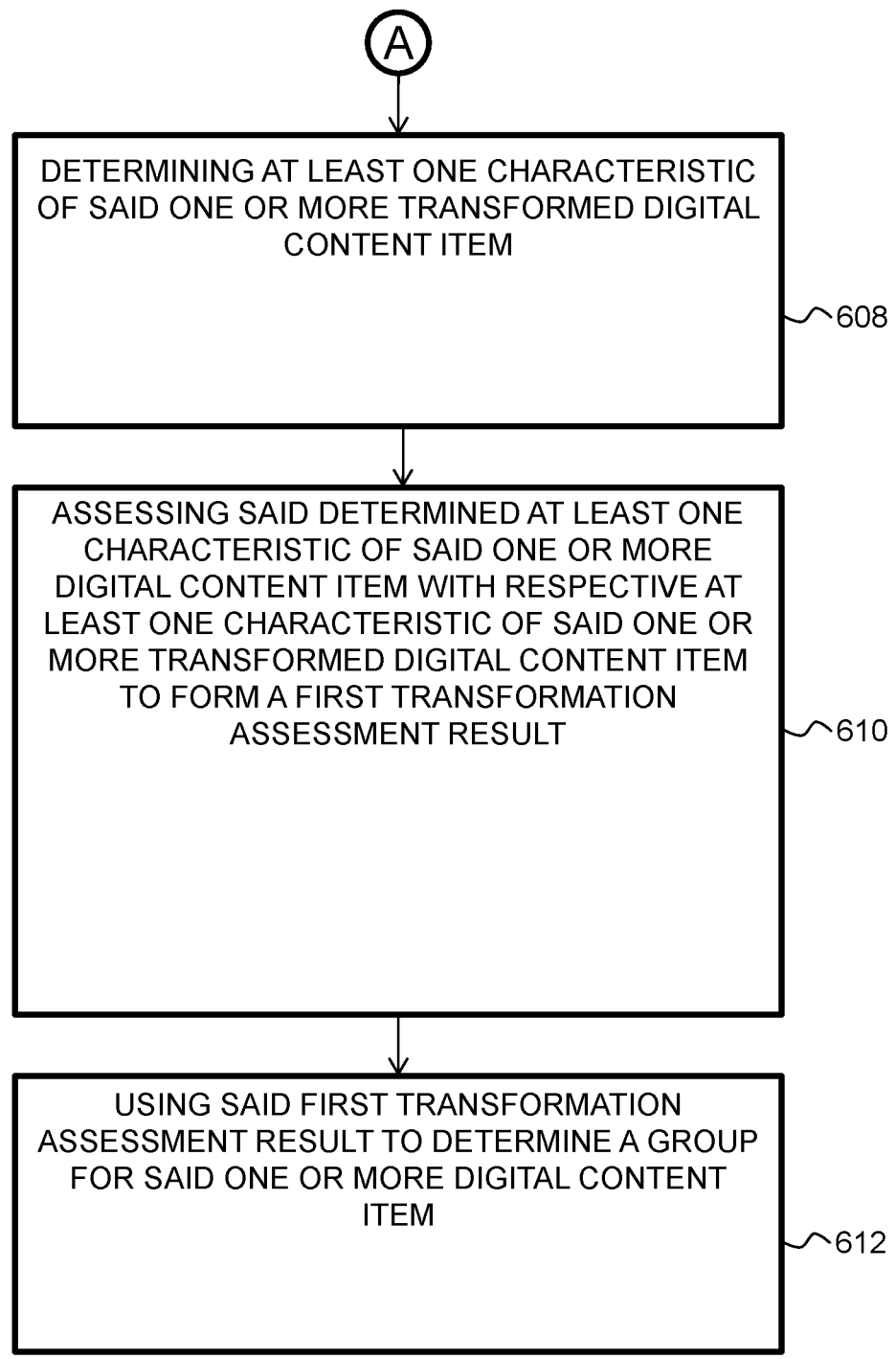

Referring to FIGS. 6A-6B, illustrated are flow diagrams that illustrates a method for identifying a group for the digital content items, in accordance with an embodiment of the present disclosure. At step 602, one or more digital content item is retrieved from transformation assessment storage 108. At step 604, at least one characteristic of each digital content item is determined. At step 606, the determined one or more digital content item is transformed to form one or more transformed digital content item using a first transformation method. At step 608, at least one characteristic of the one or more transformed digital content item is determined. At step 610, the determined at least one characteristic of the one or more digital content item is assessed with respective at least one characteristic of the one or more transformed digital content item to form a first transformation assessment result. At step 612, the first assessment result is used to determine a group for the one or more digital content item.

Figure 7A:
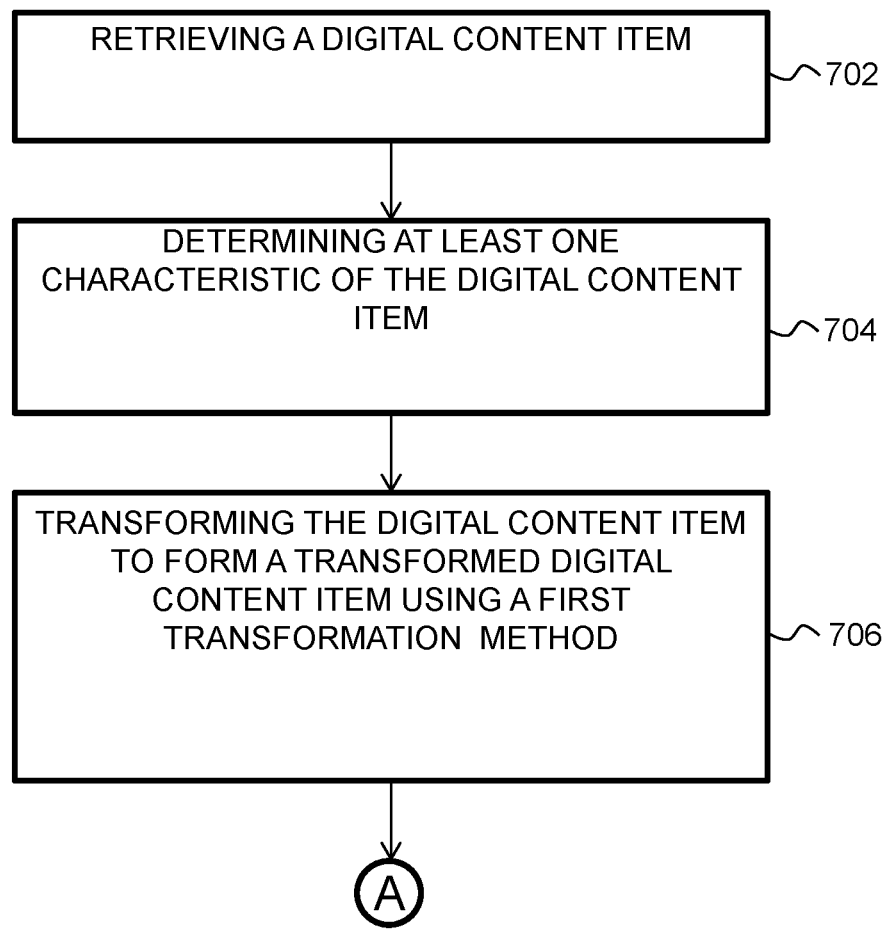
FIGS. 7A-7B are flow diagrams that illustrate a method for determining an origin of a digital content item, in accordance with an embodiment of the present disclosure.
Figure 7B:
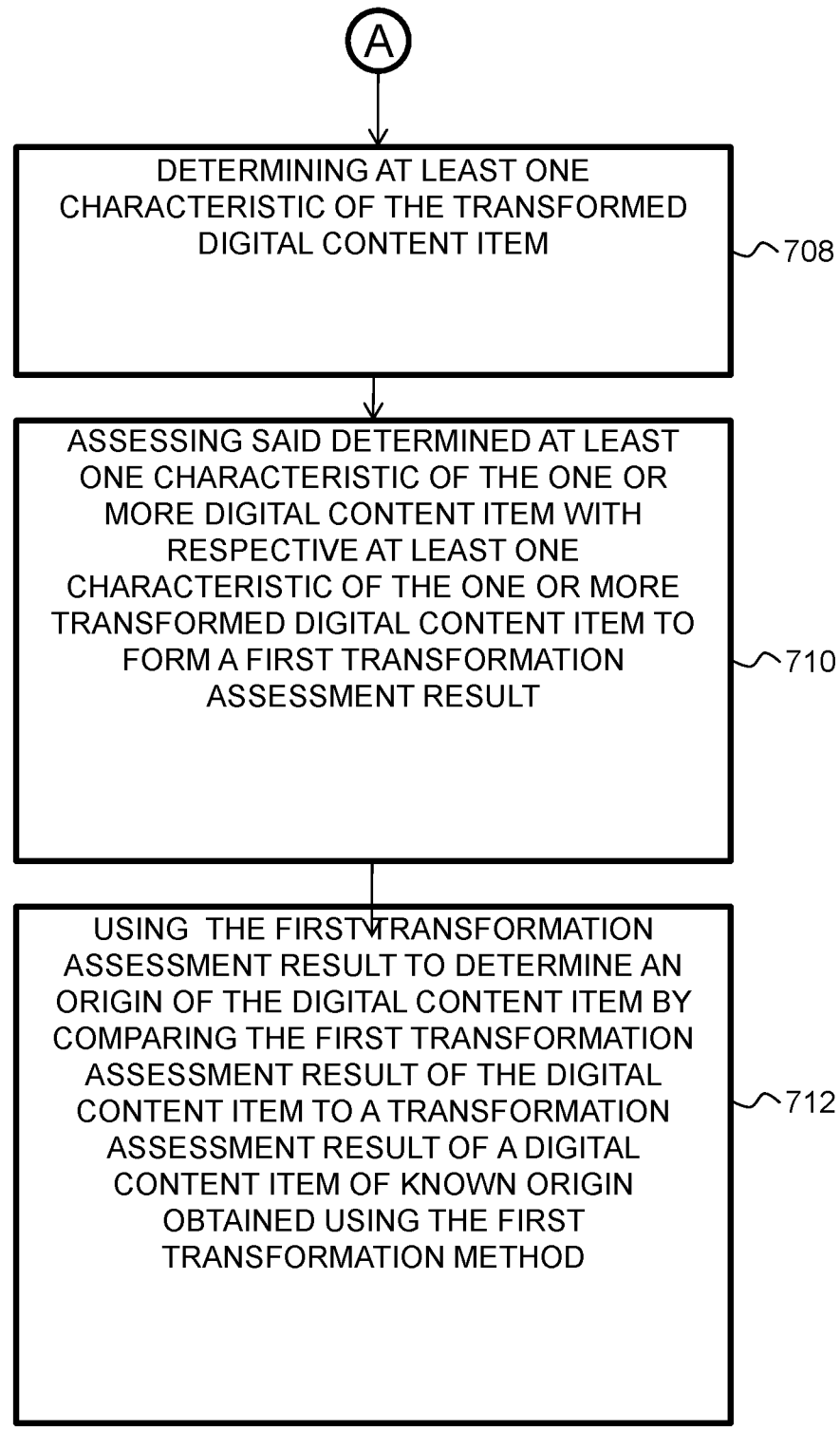

Referring to FIG. 7, illustrated is a flow diagram of a method for determining an origin of a digital content item, in accordance with an embodiment of the present disclosure. At step 702, a digital content item is retrieved from transformation assessment storage 108. At step 704, at least one characteristic of the digital content item is determined. At step 706, the digital content item is transformed to form a transformed digital content item using a first transformation method. At step 708, at least one characteristic of the transformed digital content item is determined. At step 710, the determined at least one characteristic of the one or more digital content item is assessed with respective at least one characteristic of the one or more transformed digital content item to form a first transformation assessment result. At step 712, the first transformation assessment result is used to determine an origin of the digital content item by comparing the transformation assessment result of the digital content item to a transformed assessment result of a digital content item of known origin obtained using the first transformation method.

Figure 8A:
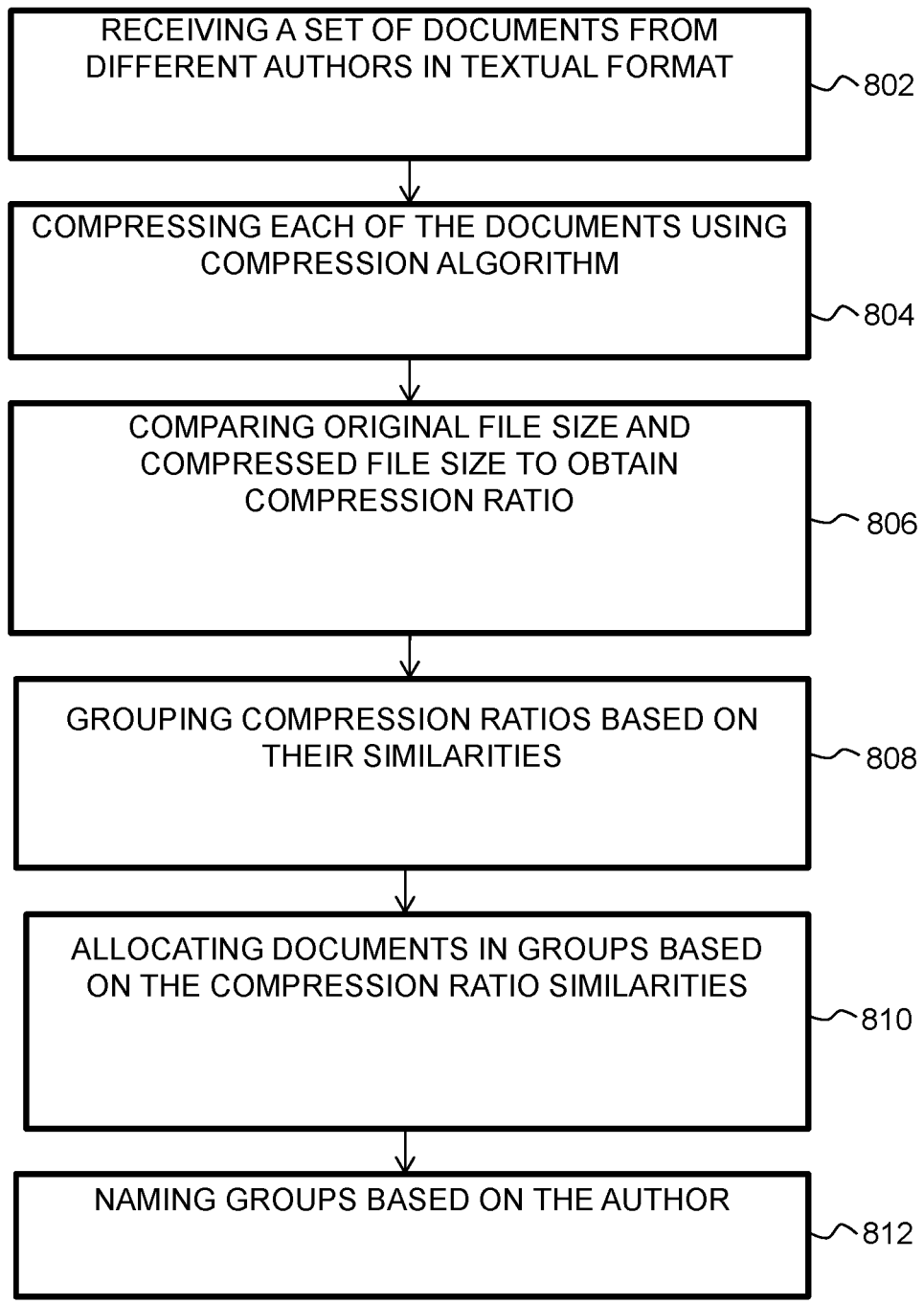
FIG. 8A is a flow diagram that illustrates a method for identifying a group for a set of digital content items based on an author, in accordance with an embodiment of the present disclosure.

Referring to FIG. 8A, illustrated is a flow diagram that illustrates a method for identifying a group for a set of digital content items based on an author, in accordance with an embodiment of the present disclosure. At step 802, a set of documents (e.g. one or more digital content item) is received from different authors in textual format. At step 804, each of the documents is compressed using a compression algorithm. At step 806, an original file size and a compressed file size are compared to obtain a compression ratio. At step 808, the compression ratios are grouped based on their similarities (e.g. which are within a range). At step 810, the documents are logically or physically grouped based on the compression ratio similarities. At step 812, the groups are named based on the author.

Figure 8B:
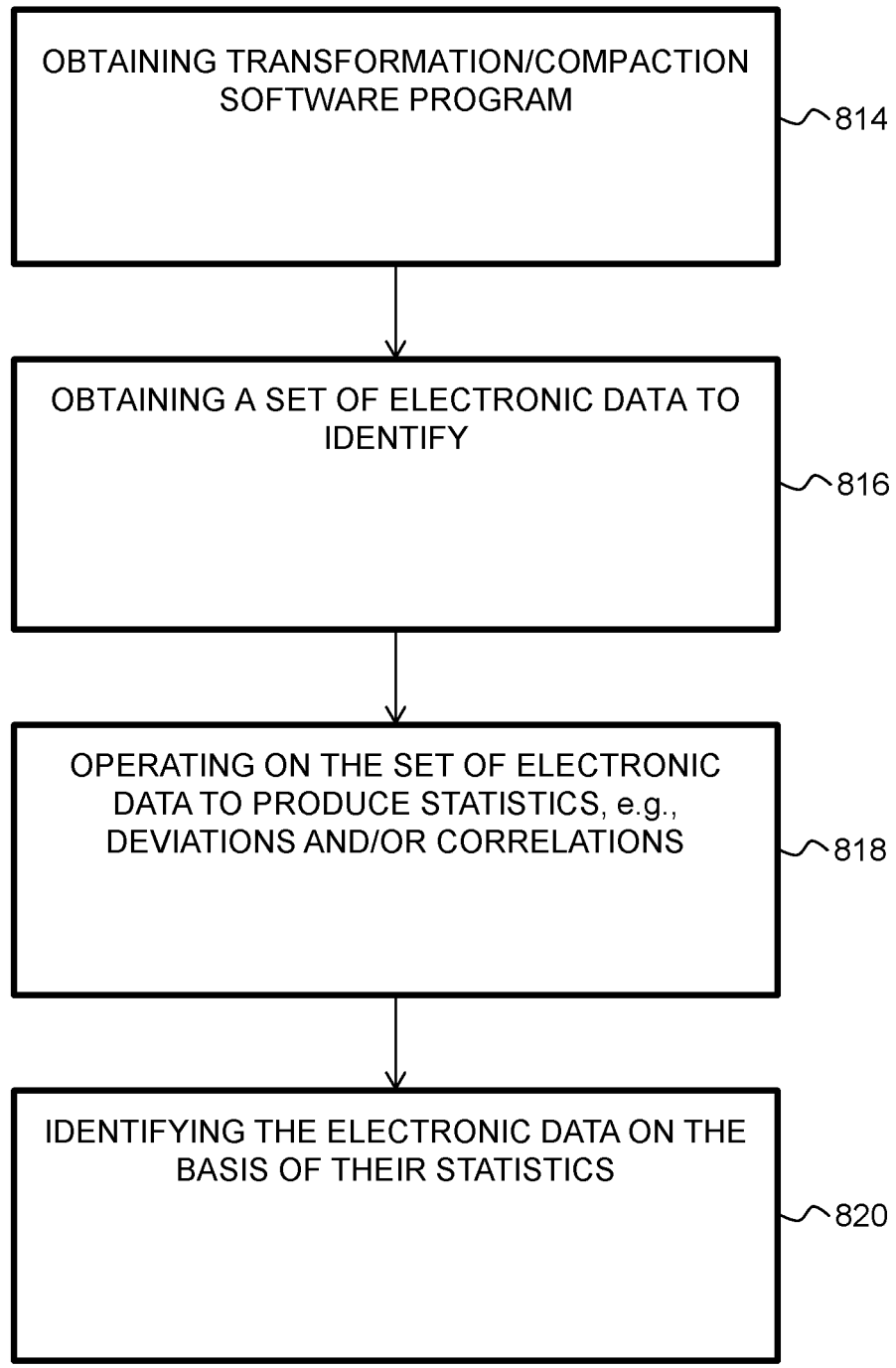
FIG. 8B is a flow diagram that illustrates a method for identifying a group for a set of digital content items using a digital content transformation system, in accordance with an embodiment of the present disclosure.

Referring to FIG. 8B, illustrated is a flow diagram that illustrates a method for identifying a group for a set of digital content items using a digital content transformation system 200, in accordance with an embodiment of the present disclosure. At step 814, a transformation software program is obtained. At step 816, a set of electronic data (e.g. one or more digital content item) is obtained for identification. At step 818, the set of electronic data is operated on to produce resulting statistics (e.g. deviations, and/or correlations). At step 820, the electronic data is identified on the basis of their statistics.

Figure 9:
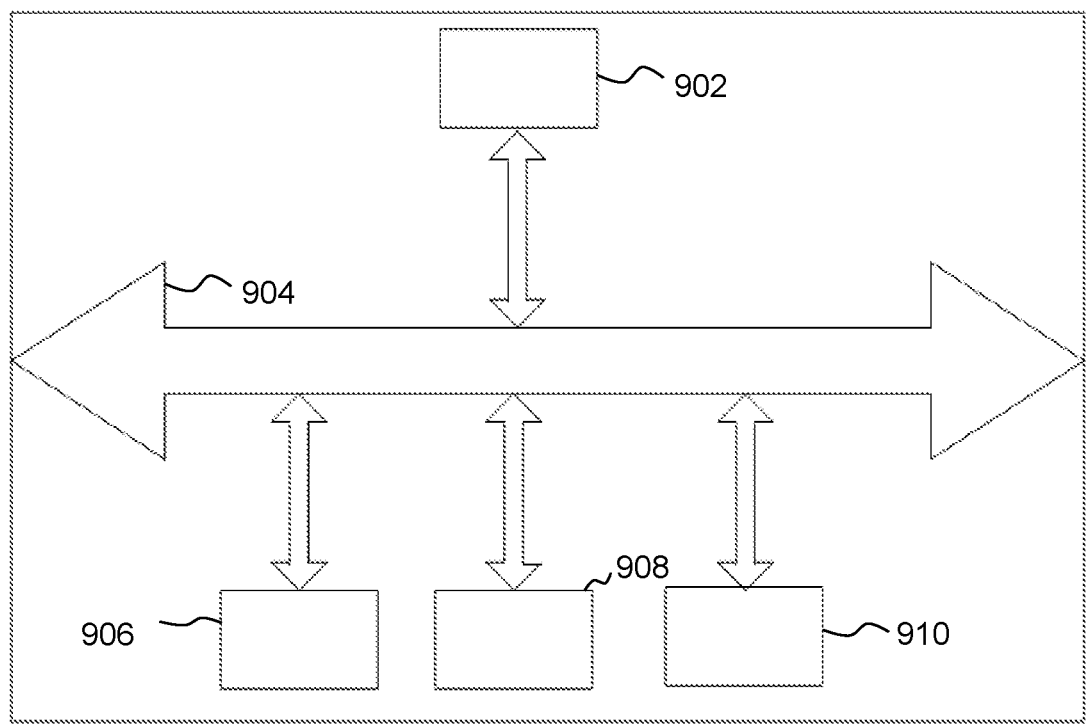
FIG. 9 is an exploded view of the receiver, in accordance with an embodiment of the present disclosure.

Referring to FIG. 9, illustrated is an exploded view of a receiver having a memory 902 having a set of instructions, a bus 904, a display 906, a speaker 908, and a processor 910 capable of processing the set of instructions to perform any one or more of the methodologies herein, according to an embodiment herein. The processor 910 may also enable digital content to be consumed in the form of video for output via one or more displays 906 or audio for output via speaker and/or earphones 908. The processor 910 may also carry out the methods described herein and in accordance with the embodiments herein.

Digital content may also be stored in the memory 902 for future processing or consumption. A user of the receiver may view this stored information on the display 906 and select an item of for viewing, listening, or other uses via input, which may take the form of keypad, scroll, or other input device(s) or combinations thereof. The content and stored information may be passed among functions within the receiver using the bus 904.

The embodiments herein can take the form of, an entirely hardware embodiment, an entirely software embodiment, or an embodiment including both hardware and software elements. The embodiments that are implemented in software include but are not limited to, firmware, resident software, microcode, scripts, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
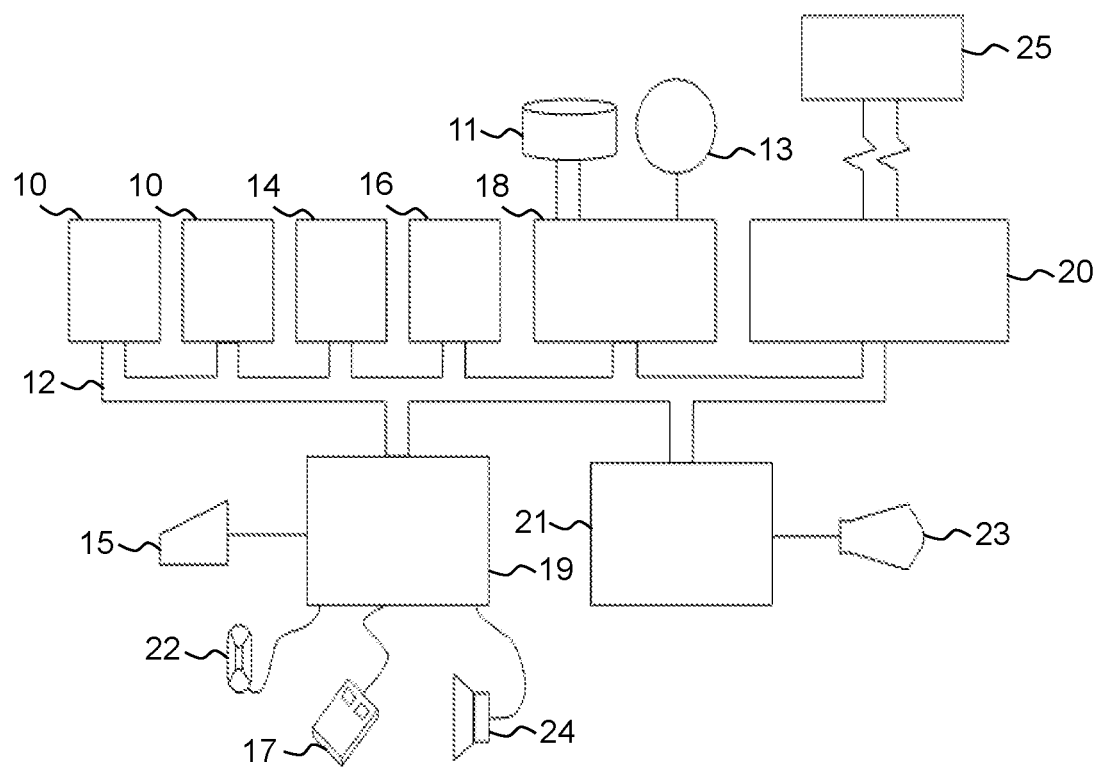
FIG. 10 illustrates a schematic diagram of computer architecture used to implement the digital content transformation server of FIG. 1, in accordance with an embodiment of the present disclosure.

A representative hardware environment for practicing the embodiments herein is depicted in FIG. 10. This schematic drawing illustrates a hardware configuration of a computer architecture/system used to implement the digital content transformation server 106 or the user device 102 of FIG. 1 in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for identifying a similarity between different digital content items, the apparatus comprising a hardware processor and a memory, wherein the memory includes non-transitory machine-readable instructions, which, when executed by the hardware processor are configured to cause the apparatus to:
   determine a characteristic of a digital content item from one or more digital content items;
   transform the digital content item with a first transformation method to form a first transformed digital content item;
   determine a characteristic of the first transformed digital content item; and then, in the following order:
   i) form a first transformation assessment result of the digital content item by comparing the characteristic of the digital content item to the characteristic of the first transformed digital content item; and, after forming first transformation assessment results for the one or more digital content items:
   ii) establish a range based on first transformation assessment results of one or more digital content items;
   iii) establish a group comprising one or more digital content items whose first transformation assessment results are within the range; and
   iv) provide one or more views of one or more members in the group comprising information about the one or more members in the group.

2. The apparatus according to claim 1, wherein the apparatus is further configured to compare the first transformation assessment results to one or more transformation assessment results of one or more digital content items of a known origin and provide one or more views of results of the comparison.

3. The apparatus according to claim 2, wherein the group is based on an identification of an origin of one or more of the digital content items, wherein the identified origin of one or more members of the group are in the range.

4. The apparatus according to claim 1, wherein the apparatus is further configured to:
   transform the digital content item with a second transformation method that is different from the first transformation method to form a second transformed digital content item; and then, in the following order:
   v) form a second transformation assessment result of the digital content item by comparing the characteristic of the digital content item to a characteristic of the second transformed digital content item; after forming second transformation assessment results for the one or more digital content items:
   vi) establish a second range based on the second transformation assessment results; and
   vii) establish a second group based on the second range of the second transformation assessment results, wherein the members of the second group have similar second transformation assessment results.

5. The apparatus according to claim 1 wherein the digital content item is in a form of one or more of a text file, a software file, a video file, or a multimedia file.

6. The apparatus according to claim 1, wherein the first transformation method comprises a compression algorithm.

7. The apparatus according to claim 1 wherein the apparatus is one or more of a computer, or a mobile device.

8. The apparatus according to claim 1, wherein the characteristic of the digital content item is a file size of the digital content item and the characteristic of the transformed digital content item is a file size of the transformed digital content item.

9. The apparatus according to claim 1 wherein the apparatus is further configured to:
   establish multiple groups based on one or more members with similar transformation assessment results; and
   provide one or more views of one or more of the multiple groups for identification.

10. The apparatus according to claim 1 wherein the one or more digital content items are a set of documents in textual format, the characteristic is a file size of a document, and the characteristic of the first transformed digital content item is a compressed file size, wherein the apparatus is further configured to compare the file size of the document to the compressed file size to obtain a compression ratio, establish the group based on the obtained compression ratios and provide one or more views of the one or more members of the group.

11. A method for identifying an origin of a digital content item using a hardware processor, the method comprising the hardware processor executing non-transitory machine readable instructions configured to cause the hardware processor to:
   determine a characteristic of a digital content item of a known origin from one or more digital content items;
   transform the digital content item of the known origin with a first transformation method to form a first transformed digital content item of the known origin;
   form a first transformation assessment result of the digital content item of the known origin by comparing the characteristic of the digital content item of the known origin to the characteristic of the first transformed digital content item of the known origin;
   determine a characteristic of a digital content item of an unknown origin;
   transform the digital content item of the unknown origin with the first transformation method to form a first transformed digital content item of the unknown origin;
   determine a characteristic of the first transformed digital content item of the unknown origin;
   form a first transformation assessment result of the digital content item of the unknown origin by comparing the characteristic of the digital content item of the unknown origin to the characteristic of the first transformed digital content item of the unknown origin; and then, after forming first transformation assessment results for one or more digital content items of an unknown origin:
   establish a range based on the first transformation assessment results of the one or more of the digital content items of the unknown origin;
   compare the first transformation assessment results of the one or more digital content items of the unknown origin to the first transformation assessment results of the one or more digital content items of the known origin;
   identify an origin of the one or more digital content items of the known origin as an origin of the one or more digital content items of the unknown origin when the comparison result is within the range; and
   provide one or more views comprising information of the identified origin of the one or more digital content items of the unknown origin.

12. The method according to claim 11, the method further comprising the hardware processor comparing the first transformation assessment results of the one or more digital content items of the unknown origin to one or more first transformation assessment results of one or more digital content items of the known origin and providing one or more views of results of the comparison.

13. The method according to claim 11, wherein the method further comprises the hardware processor:
transforming the one or more digital content items with the known origin with a second transformation method that is different from the first transformation method to form one or more second transformed digital content items; and then, in the following order:
v) forming one or more second transformation assessment results of the one or more digital content items of the known origin by comparing respective characteristics of the one or more digital content items of the known origin to respective characteristics of the one or more second transformed digital content items of the known origin;
vi) establishing a second range based on the one or more second transformation assessment results of the one or more of the digital content items of the known origin; and
vii) establishing a group based on the range of the one or more second transformation assessment results, wherein the members of the group have similar one or more second transformation assessment results.

14. The method according to claim 11 wherein the digital content item is in a form of one or more of a text file, a software file, a video file or a multimedia file.

15. The method according to claim 11, wherein the first transformation method comprises a compression algorithm.

16. The method according to claim 11 wherein the method is performed using one or more of a computer or a mobile device.

17. The method according to claim 11, wherein a determined characteristic is a file size.

18. The method according to claim 11 wherein the hardware processor is further configured to:
establish multiple groups of digital content items, wherein individual ones of the multiple groups are based on one or more members with a same identified origin, wherein the multiple groups have different origins; and
provide one or more views of information of the one or more multiple groups for identification of the different origins.

19. The method according to claim 11 wherein the digital content item is included in a set of documents in textual format, the determined characteristic is a file size of a document, and the determined characteristic of the first transformed digital content item of a known origin is a compressed file size, wherein the method further comprises the hardware processor being configured to compare the file size of the document to the compressed file size to obtain a compression ratio, compare the obtained compression ratio to a compression ratio of a document of the known origin and identify the document as having the known origin when the comparison result is within the range.

20. An apparatus for grouping files comprising text, that apparatus comprising a hardware processor configured to execute non-transitory machine-readable instructions, which when executed by the hardware processor, are configured to cause the hardware processor to:
compress one or more files comprising text to form one or more compressed files; and then, in the following order:
i) extract a file ratio of the one or more compressed files from metadata of the one or more compressed files;
ii) establish a range of file ratios based on the metadata of the one or more compressed files;
iii) establish one or more groups of the one or more files comprising text, wherein a group includes one or more files comprising text with corresponding extracted file ratios that are within the range; and
iv) provide one or more views comprising information of the one or more groups of files comprising text.

21. The apparatus according to claim 20, wherein the apparatus is further configured to compare the extracted file ratio to a file ratio of a file comprising text of known origin and identify an origin of the file comprising text as the known origin when a result of the comparison is within the range.

* * * * *